INVENTOR.
C. C. LARSON
BY
RPMorris
ATTORNEY

Sept. 2, 1958 C. C. LARSON 2,850,565

TELEVISION CAMERA TUBE ARRANGEMENT WITH FADING CONTROL UTILIZING AN ADDITIONAL CAMERA TUBE

Filed Jan. 24, 1952 2 Sheets-Sheet 2

INVENTOR.
C. C. LARSON
BY R P Morris
ATTORNEY 2,850,565
Patented Sept. 2, 1958

1

2,850,565

TELEVISION CAMERA TUBE ARRANGEMENT WITH FADING CONTROL UTILIZING AN ADDITIONAL CAMERA TUBE

Christian C. Larson, Fort Wayne, Ind., assignor to Farnsworth Research Corporation, Fort Wayne, Ind., a corporation of Indiana Application January 24, 1952, Serial No. 267,958

7 Claims. (Cl. 178—7.2)

This invention relates to television pick-up tube systems and more particularly to a television camera tube arrangement with fading control.

In television systems it is often desired to produce a fade-out or fade-in effect of pictures, or to otherwise control picture systems to superimpose ghost images on the picture scene. Various types of systems utilizing one or more camera tubes have been proposed for this purpose.

In an application of J. C. Ferguson and the present inventor, Serial No. 142,477, filed February 4, 1950, now Patent No. 2,599,021, issued June 3, 1952, there is described a camera or television pick-up tube wherein a mosaic element is first brought to a positive potential through the scanning of the surface by a first beam, an image is then impressed on this mosaic serving to reduce the positive potential in varying amounts corresponding with the image brightness, and the mosaic is then scanned by a second beam reducing it to a still lower and substantially constant potential for reading off the storage picture signals.

Other systems have been proposed wherein picture signals are derived by bringing a mosaic to a single reference potential by means of a single scanning gun.

It is an object of this invention to provide, in camera tubes of the types described above, control circuits for controlling the reference voltage of an electron gun for the purpose of controlling the picture signals to produce desired effects such as picture fade-out or fade-in or ghost image presentation.

In accordance with the broad features of this invention there is provided a picture signal generating circuit having a charge storage means, and means for storing picture signals, means for bringing the storage means to a reference potential once per picture cycle, means for discharging the storage means under influence of impinging radiation and a device for varying, in timed relation with the picture scanning, the reference potentials to control the picture transmission.

According to a feature of this invention there may be provided a signal generating tube having a charge storage mosaic, a first electron beam source for scanning this mosaic normally to provide a predetermined positive reference charge potential thereon, a means for selectively discharging this mosaic to lower positive potentials in accordance with a signal pattern, a second electron gun for scanning the mosaic to reduce the area to a second common predetermined reference potential, and means comprising a control voltage source for controlling the velocity of electrons from the one of said electron guns to vary the reference potential charge applied to the mosaic.

In accordance with the above features of this invention the control source may be simply a variable voltage which may be synchronized with the scanning of the beam from the first gun which serves selectively to reduce the velocity of the electron beam so that a lower positive charge is produced thereon, resulting effectively in a fading of the output image signals upon scanning by the second gun. This control source may alternatively be varied in accordance with different picture signal voltages to impress on the mosaic variable positive charges producing in the output circuit a double or ghost image of the applied signals in addition to the normally scanned scene.

The above-mentioned and other features and objects of this invention and the manner of attaining them will become more apparent and the invention itself will be best understood by reference to the following description of an embodiment of the invention taken in conjunction with the acompanying drawings, in which.

Figure 1:
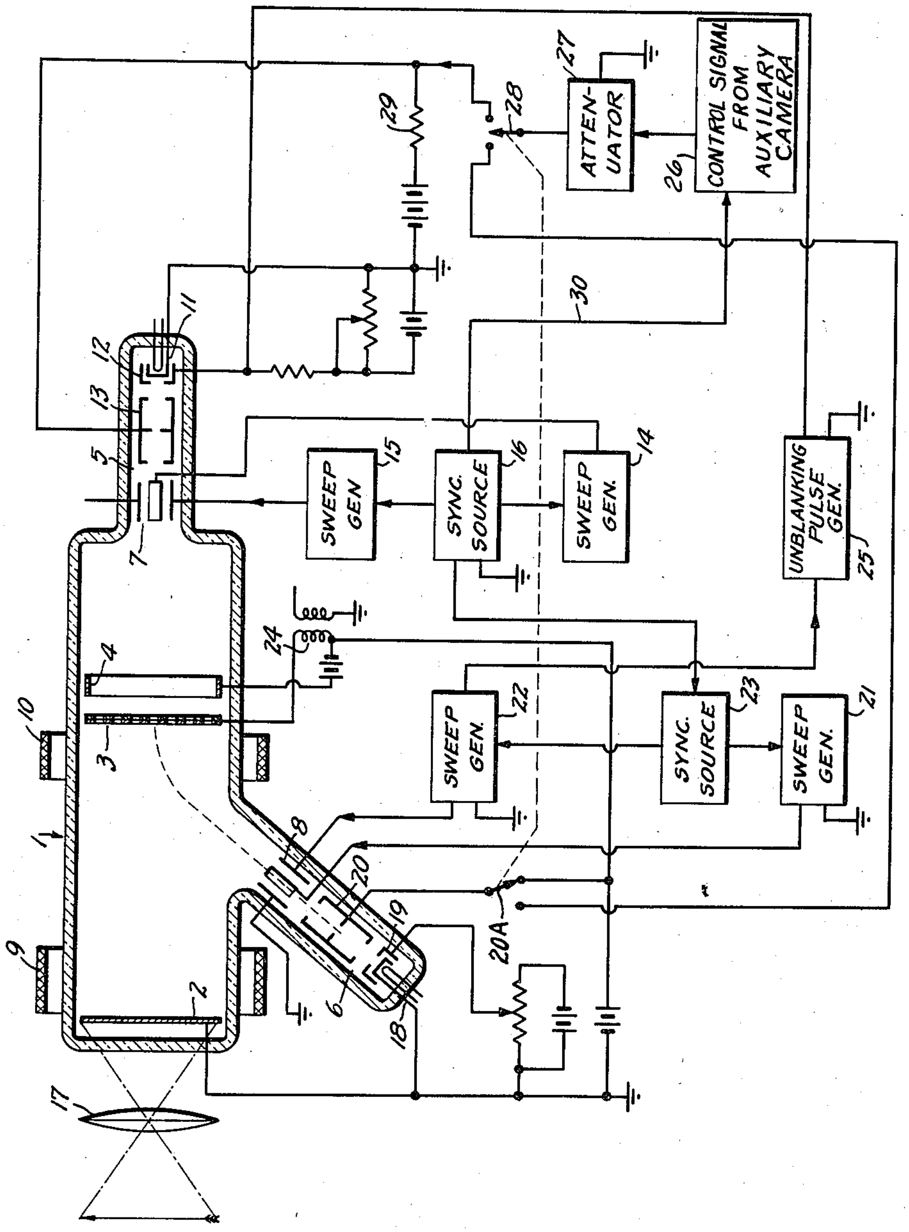
Fig. 1 is a schematic diagram partly in sectional view of a television camera tube and system illustrating the application of the invention.

Turning to Fig. 1, there is shown a camera tube 1, by way of example, which may comprise a photo-electric cathode 2, a double sided mosaic 3, a collector electrode 4, first and second electron gun structures 5 and 6 and respective deflecting means 7 and 8. Focussing coils 9 and 10 may be provided to focus the electron image from photo-cathode 2 on the mosaic 3.

The first electron gun 5 may comprise a cathode 11, a negatively biassed control electrode 12 and accelerating focussing electrode structure 13 as well as the deflecting electrodes 7. The horizontal and vertical sweep generators 14 and 15 are coupled to the respective deflecting plates 7 and controlled over a common synchronizing source 16. Since the beam from gun 5 serves only to produce the initial positive charge on mosaic 3 the sweep generators 14 and 15 may be of any desired construction and need not follow the regular picture scanning pattern. For example, these sweep generators may be made to operate in spiral fashion so as to apply the charge either from the outer outer edge of the mosaic to the center or to scan from the center outward. Alternatively, the regular rectangular type of sweep raster may be used or any other form desired. After application of this charge to mosaic 3 or simultaneously therewith, the picture image to be transmitted may be applied through a lens system to photo-cathode 2. The electron image emitted from photo-cathode 2 is directed against mosaic 3 at a velocity insufficient to produce secondary electron emission and thus tends to reduce any positive charge on mosaic 3 in accordance with the variations in light from the image to be transmitted.

After the image signals have been impressed upon mosaic 3, or simultaneous with the application of such signals to the mosaic, the electron gun 6 is brought into operation. This gun may comprise a cathode 18, a negatively biassed control electrode 19 and positively biassed accelerating and focussing electrode assembly 20, as well as the scanning elements 8. Horizontal and vertical sweep generators 21, 22 are provided for the corresponding deflecting electrode 8 and synchronized by synchronizing source 23 which, in turn, is synchronized with synchronizing source 16. As is well known, the timing of sources 16 and 23 may control the sequential scanning of beams from guns 5 and 6 respectively. The beam from electron gun 6 is of insufficient velocity to produce secondary electron emission from mosaic 3 and is of sufficient density to reduce the charges on the electrode 3 to a substantially constant negative value. Upon scanning the mosaic with the beam from gun 6 the varying picture storage voltages are neutralized and thus picture signals in accordance with those stored on mosaic 3 are transmitted over the transformer 24 to an output circuit.

Since electron gun 5 is preferably maintained inoperative during the scanning of the mosaic from gun 6 an unblanking generator 25 may be provided, controlled by the wave from vertical sweep generator 22, so as to release the gun 5 upon completion of the picture reading scanned from gun 6.

The apparatus so far described in connection with Fig. 1 is substantially in accord with the operation of systems described in the aforementioned application Serial No. 142,477. According to this invention the output picture is also controlled by applying desired modulating voltages to the electron beam from gun 5. To accomplish this there is provided a control source 26 from which control energy may be applied to electrode 13. An attenuator 27 is shown in this electrode energizing circuit for the purpose of adjusting the signal energy from the control source 26 to electrode 13. In view of the fact that it may be desirable to have the energy from source 26 vary in synchronism with the scanning of the beam from gun 5 a synchronizing connection 30 may be provided between synchronizing source 16 and control source 26. The output voltage from source 26 may be applied to the camera tube 1 at predetermined times when it is desired to control the picture image signals. For this reason the circuit is connected through a switch 28 so that it may be disconnected when only direct picture transmission is desired.

If sweep generators 14 and 15 are designed so that a spiral scan of the beam from gun 5 is used, the voltage from control source 26 may be made progressively to apply negative voltages to electrode 13 so as progressively to reduce the brilliance of the picture signals as transmitted. This will produce effectively a circular fade-out of the picture signals. If, on the other hand, regular horizontal and vertical sweeps are used then the control signals will produce a gradual fading of the picture from the top to the bottom. The timing control wave may have a period equal to one frame period or to several frame periods so that the fading control may be made to operate in a single frame of scanning or may be designed to operate over a period of several frames.

Instead of controlling the picture by controlling the positive reference level established by gun 5, the control can be effected by means of adjustment of the reference level produced by the beam of gun 6. This may be accomplished by moving switch 28 and switch 20A to the left as indicated so that the output of control source 26 is applied to electrode 20 of gun 6.

Figure 3:
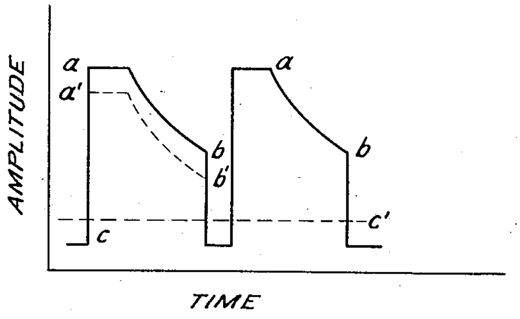
Fig. 3 is a graphical representation used in explaining the operation of the system in accordance with my invention.

As an example of how the various reference control levels can be adjusted to vary the signal, reference is made to the graph shown in Fig. 3. The general idea of the invention is to take advantage of the storage type of tube in which the mosaic is brought to a reference potential, once per frame, for the insertion of a ghost picture or fading signals by varying the refernce potential. In the tube and circuit illustrated in Fig. 1 there are two reference potentials corresponding to points *a* and *c* of graph 3. *a* represents the positive potential to which the mosaic is brought at the start of each frame or field. The potential then drops along the graph *ab* under the influence of the impinging light. Upon the scanning of the mosaic the potential is brought down to the level *c*. It will then be appreciated that the output signal consists in the difference between the value *b* and *c*. If *a* is varied to bring it down to *a'* then the output signal becomes *b'c*, which is lower in potential. However, the same result can be achieved by changing reference voltage up to the level *c'*. Then reference potential *a* still remains the same but after the effect of the light is applied the output signal becomes *bc'* which is the same as *b'c* in magnitude as can readily be seen. Furthermore, this general principle of effecting control by variable adjustment of the reference potential can be applied to tubes in which only one reference potential is used instead of the two reference potentials as is done in the present disclosure.

Alternatively, control source 26 may be energized by picture signals from a separate camera tube so that this picture as well as that applied to photo-cathode 2 will appear in the output signals. In this case it may be desirable to have a dual type of control which will increase the brilliance of this added picture or cause it to fade out, which may be accomplished by means of the attenuator network 27. In some instances it may be desired to superimpose this ghose image on the picture signal from tube 1 and then cut out this tube entirely and transmit the new picture from the second tube.

Figure 2:
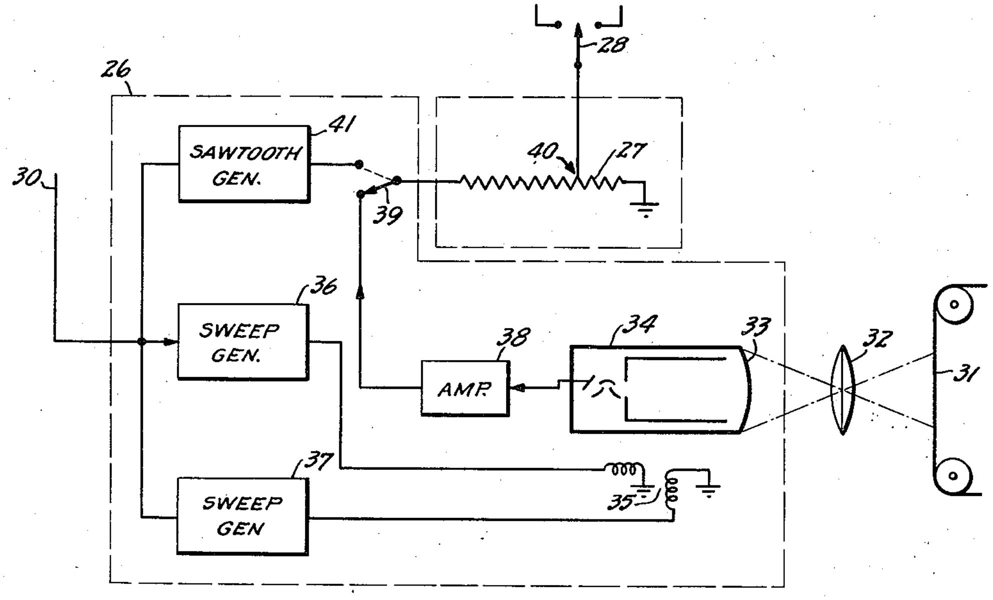
Fig. 2 is a schematic circuit diagram illustrating a specific type of control circuit arrangement for use in the system of Fig. 1.

As an example of a possible circuit arrangement for such purposes, Figure 2 shows in more detail the elements 27–30 of Figure 1. It has been assumed that it is desired, at the choice of the operator, to inject a circular fade-out or a second ghost picture. The ghost picture may be taken from film 31, which is imaged by lens 32 on the translucent cathode 33 of a tube 34; this tube is shown in the drawing as a dissector, scanned by coils 35 which are energized by sweep generators 36, 37; the latter ones are synchronized through lead 30 with the sync source of the main camera. The voltage sources energizing the dissector are not shown. The output signal of tube 34 is amplified in amplifier 38 and is then fed, through switch 39, into the attenuator 27. The tap point 40 of 27 can be operated manually, and is connected to switch 28 which also appears in Figure 1. It is seen that the ghost image as recorded on film 31 will appear rather strong in the output of the main tube, if point 40 is at the left end of attenuator 27, while it fades entirely away as 40 is moved to the right end. Of course, if switch 28 is opened, there will be no ghost picture.

The sync source 16 of Figure 1 as assumed to provide a spiral scan, which, e. g. may move outward from the center. Synchronized with it through lead 30 is a sawtooth generator 41 which gives one sweep for each spiral frame. If switch 39 is thrown into its upward position, this sawtooth voltage is applied to attenuator 27, and thus the picture can be made to increase or decrease in brightness toward its outer rim, depending on the polarity of the sawtooth voltage. Tap 40 is in this case adjusted so as to give the proper brightness gradation.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A television signal-generating apparatus comprising an image-storing tube having an electrode upon which a charge may be impressed and stored, a first source of electrons, first means for directing said electrons onto said electrode for producing a first reference charge thereon, second means for projecting an electron image onto said electrode for altering said reference charge in such a manner as to produce a charge replica of said image on said electrode, a second source of electrons, third means for directing said second electrons onto said electrode for altering said charge replica to a second reference charge, fourth means operatively coupled to said electrode for generating an electrical signal corresponding to said charge replica as said second reference charge is being produced, and circuit means operatively coupled to said first means for forming said first reference charge on the pattern of a selected image, whereby said electrical signal will correspond to the composite of said selected image and said image replica.

2. A television signal-generating apparatus comprising an image-storing tube having a mosaic upon which a charge may be impressed and stored, a first source of electrons, electrode devices for directing said electrons onto said mosaic for producing a first reference charge thereon, photoelectric cathode means for producing an electron beam corresponding in cross section to a preselected image and for directing said beam onto said mosaic whereby said first reference charge is altered to correspond to said image, an electron gun arranged to scan a stream of electrons over said mosaic for reducing the altered mosaic charge to a second reference charge, a utilization circuit operatively coupled to said mosaic for producing an electrical signal corresponding to said image as said second reference charge is developed, and a biasing circuit operatively associated with said mosaic for varying selectively one or the other of said reference charges, said biasing circuit including a television signal-producing device which modulates one of said reference charges in accordance with a second preselected image, said electrical signal thereby representing a composite of both of the aforesaid images.

3. A cyclic signal generating circuit comprising: a tube having a charge storage means, a first means including an electron beam source and scanning means for charging the said storage means to a first reference potential, means for modifying the potential on said storage means in accordance with an image signal pattern, a second means including an electron beam source and scanning means for further modifying said potential to a common second reference potential, a source of control signals comprising means for producing voltages corresponding to a different image signal, and means for applying said control signals to one of said first and second means to control the level of one of said reference potentials whereby a superimposed signal will be produced upon discharge of said charge storage means.

4. A television signal-generating apparatus comprising: an image storing tube having a mosaic upon which a charge may be impressed and stored; a first electron gun having a control electrode and arranged to scan a stream of electrons over said mosaic for producing a first reference charge thereon; photoelectric cathode means for producing an electron beam corresponding in cross-section to a first preselected image and for directing said beam onto said mosaic whereby said first reference charge is altered to correspond to said image; a second electron gun having a control electrode and arranged to scan a stream of electrons over said mosaic for reducing the altered mosaic charge to a second reference charge; a utilization circuit operatively coupled to said mosaic for providing an electrical output signal corresponding to said image as said second reference charge is developed; a television signal-producing device providing a signal in accordance with a second preselected image; and circuit connections for selectively applying said last-named signal on said control electrode of one of said electron guns thereby modulating one of said reference charges whereby said output signal represents a composite of both of said first and second images.

5. A television signal-generating apparatus comprising: an image storing tube having a mosaic upon which a charge may be impressed and stored; a first electron gun having a control electrode and arranged to scan a stream of electrons over said mosaic for producing a first reference charge thereon; photo-electric cathode means for producing an electron beam corresponding in cross-section to a first preselected image and for directing said beam onto said mosaic whereby said first reference charge is altered to correspond to said image; a second electron gun having a control electrode and arranged to scan a stream of electrons over said mosaic for reducing the altered mosaic charge to a second reference charge; a utilization circuit operatively coupled to said mosaic for providing an electrical output signal corresponding to said image as said second reference charge is developed; a television signal-producing device providing a signal in accordance with a second preselected image; a source of selectively variable voltage; and circuit connections for selectively connecting one of said source of selectively variable voltage and said last-named signal producing device to said control electrode of one of said electron guns thereby selectively to vary one of said reference charges whereby said output signal may be selectively faded or represent a composite of both of said first and second images.

6. A television signal-generating apparatus comprising: an image storage tube having a mosaic upon which a charge may be impressed and stored; a first electron gun having deflection and control electrodes and arranged to scan a stream of electrons over said mosaic for producing a first reference charge thereon; photoelectric cathode means for producing an electron beam corresponding in cross-section to a first preselected image, and for directing said beam onto said mosaic whereby said first reference charge is altered to correspond to said image; a second electron gun having deflection and control electrodes and arranged to scan a stream of electrons over said mosaic for reducing the altered mosaic charge to a second reference charge; a utilization circuit operatively coupled to said mosaic for producing an electrical output signal corresponding to said image as said second reference charge is developed; first vertical and horizontal sweep voltage generating means coupled to said reflecting electrodes of said first electron gun; second vertical and horizontal sweep voltage generating means coupled to said deflecting electrodes of said second electron gun; common synchronizing means for said first and second vertical and horizontal sweep voltage generating means; a television signal-producing tube for providing a signal in accordance with a second preselected image, said television signal-producing tube having vertical and horizontal deflecting elements; vertical and horizontal sweep voltage generating means for said television signal-producing tube vertical and horizontal elements, said last-named vertical and horizontal sweep voltage generating means being coupled to said common synchronizing means for synchronization thereby; and circuit connections for selectively applying said last-named signal on said control electrode of one of said electron guns thereby modulating one of said reference charges whereby said output signal represents a composite of both of said first and second images.

7. A television signal-generating apparatus comprising: an image storage tube having a mosaic upon which a charge may be impressed and stored; a first electron gun having deflection and control electrodes and arranged to scan a stream of electrons over said mosaic for producing a first reference charge thereon; photoelectric cathode means for producing an electron beam corresponding in cross-section to a first preselected image, and for directing said beam onto said mosaic whereby said first reference charge is altered to correspond to said image; a second electron gun having deflection and controlling electrodes and arranged to scan a stream of electrons over said mosaic for reducing the altered mosaic charge to a second reference charge; a utilization circuit operatively coupled to said mosaic for producing an electrical output signal corresponding to said image as said second reference charge is developed; first vertical and horizontal sweep voltage generating means coupled to said deflecting electrodes of said first electron gun; second vertical and horizontal sweep voltage generating means coupled to said deflecting electrodes of said second electron gun; common synchronizing means for said first and second vertical and horizontal sweep voltage generating means; a television signal-producing tube for providing a signal in accordance with a second preselected image, said television signal-producing tube having vertical and horizontal deflecting elements; vertical and horizontal sweep voltage generating means for said television signal-producing tube vertical and horizontal elements, said last-named vertical and horizontal sweep voltage generating means being coupled to said common synchronizing means for synchronization thereby; sawtooth voltage generating means coupled to said common synchronizing means for synchronization thereby; selectively variable attenuating means; circuit connections for selectively connecting one of said sawtooth voltage generating means and the output of said television signal-producing tube to said attenuating means; and circuit connections for selectively selecting said attenuating means to said control electrode of one of said electron guns thereby selectively to vary one of said reference charges whereby said output signal may be selectively faded or represent a composite of both said first and second images.

References Cited in the file of this patent

UNITED STATES PATENTS

| | | |
|---|---|---|
| 2,146,822 | Henroteau | Feb. 14, 1939 |
| 2,147,760 | Vance | Feb. 21, 1939 |
| 2,158,259 | Tihanyi | May 12, 1939 |
| 2,164,520 | Henroteau | July 4, 1939 |
| 2,197,863 | Iams | Apr. 23, 1940 |
| 2,256,300 | Van Mierlo | Sept. 16, 1941 |
| 2,260,911 | Knick | Oct. 28, 1941 |
| 2,262,123 | Sukumlyn | Nov. 11, 1941 |
| 2,265,365 | Gebrauer | Dec. 9, 1941 |
| 2,339,662 | Teal | Jan. 18, 1944 |